(No Model.)　　　　　　　　　　　　　　　　　　　　　3 Sheets—Sheet 1.
M. NICHOLSON.
HOT WATER BOILER.
No. 443,329.　　　　　　　　　　　　　　　Patented Dec. 23, 1890.
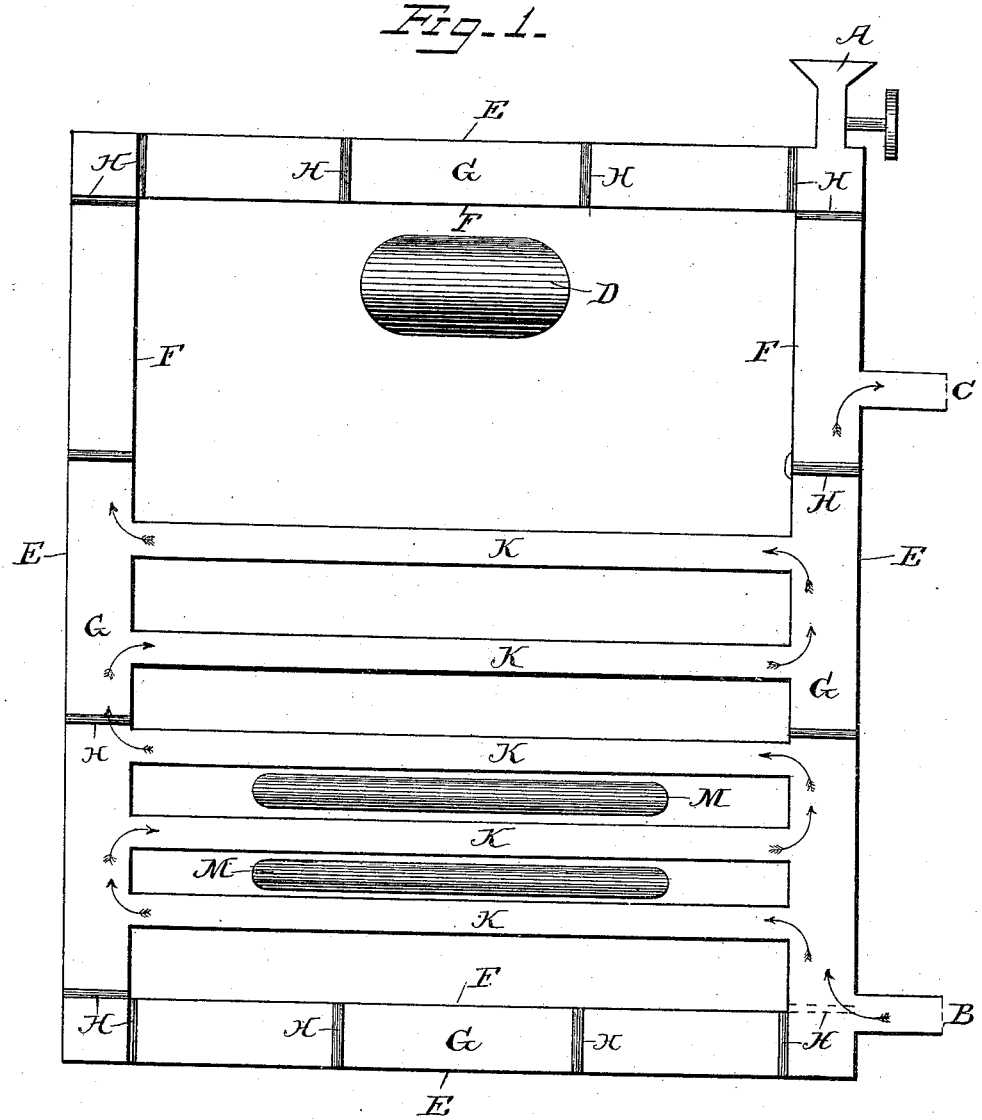

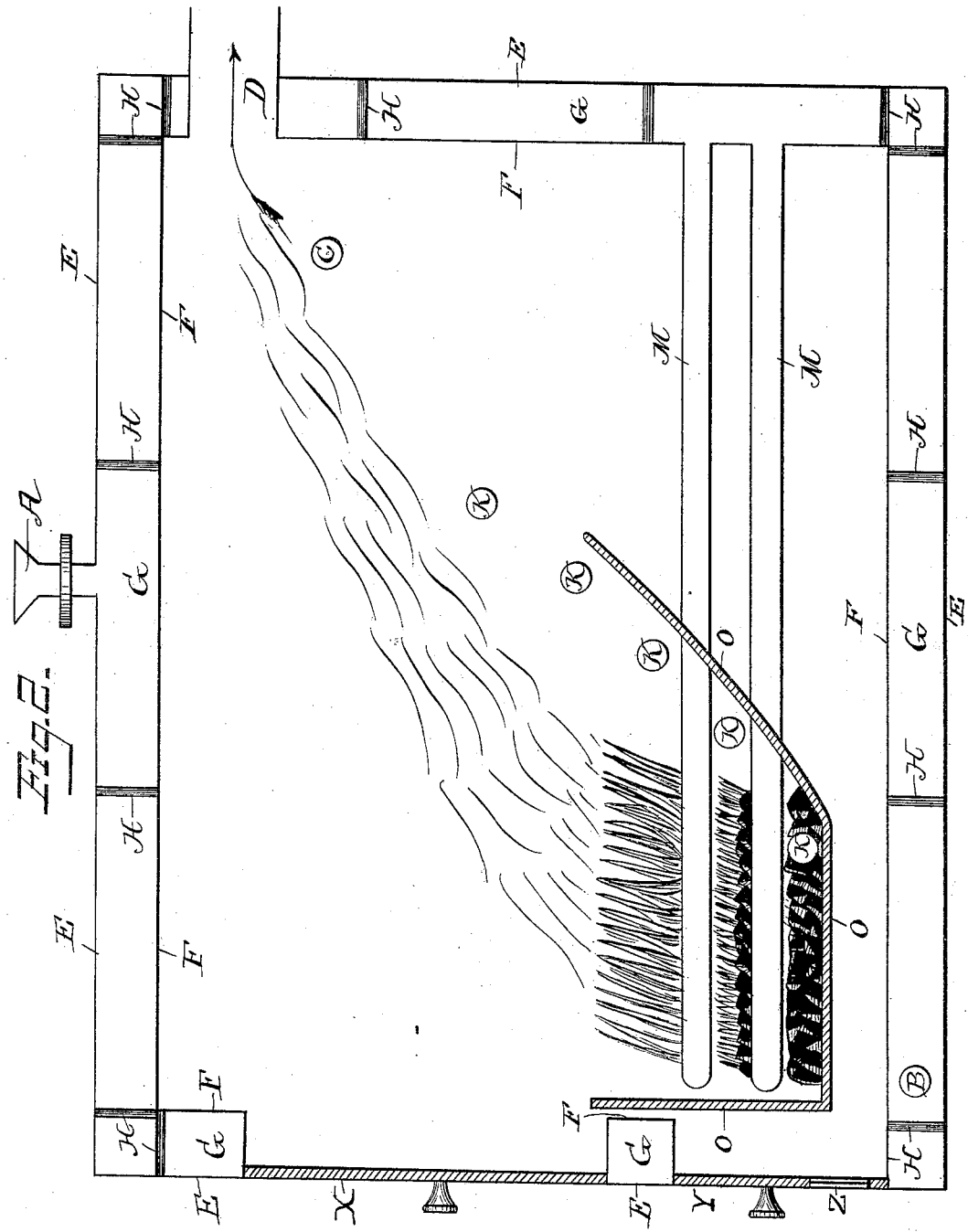

(No Model.) 3 Sheets—Sheet 3.
M. NICHOLSON.
HOT WATER BOILER.
No. 443,329. Patented Dec. 23, 1890.
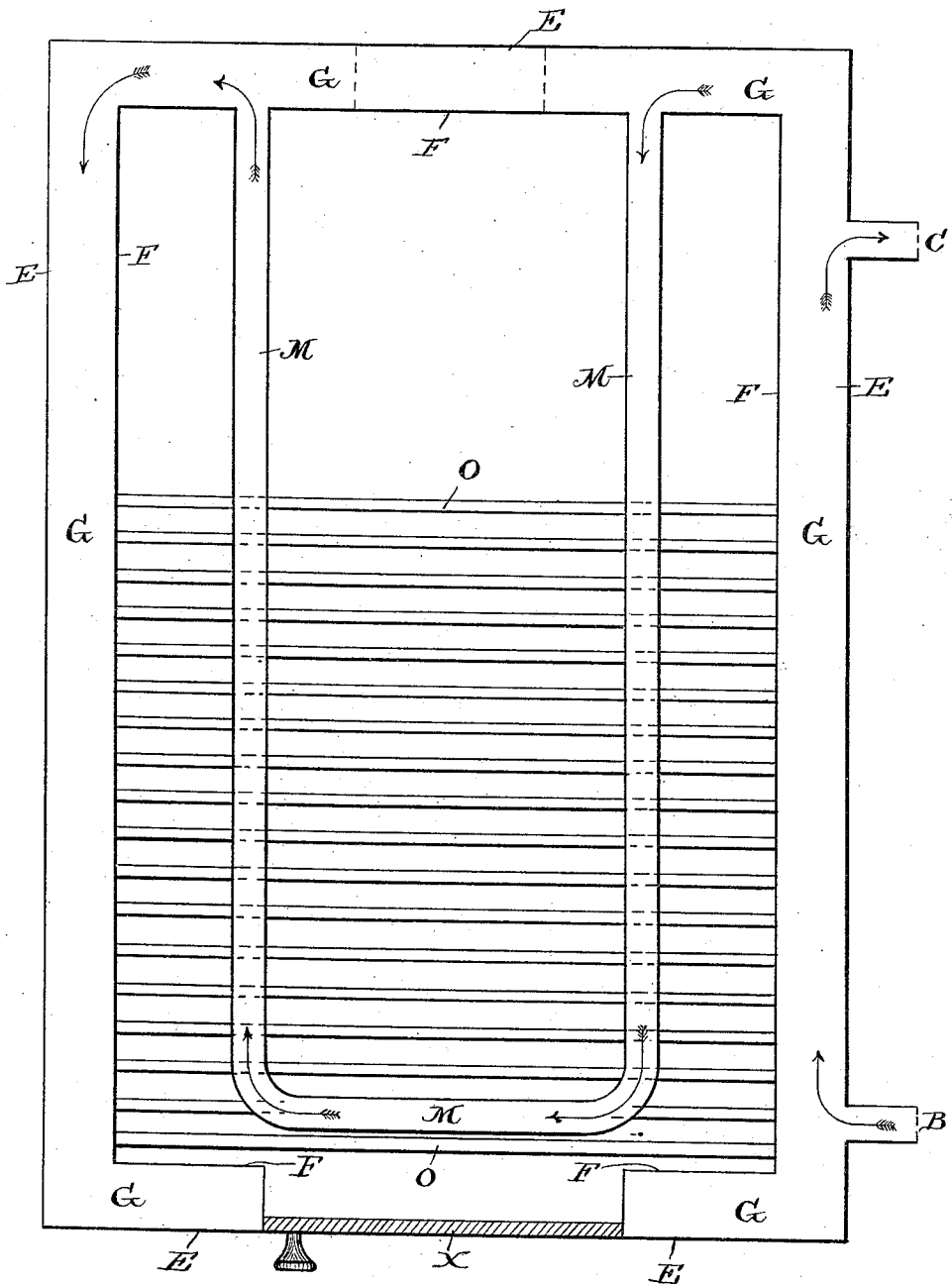

UNITED STATES PATENT OFFICE.

MALCOLM NICHOLSON, OF GODERICH, ONTARIO, CANADA.

HOT-WATER BOILER.

SPECIFICATION forming part of Letters Patent No. 443,329, dated December 23, 1890.

Application filed September 23, 1889. Serial No. 324,860. (No model.) Patented in Canada November 8, 1889, No. 32,751.

*To all whom it may concern:*

Be it known that I, MALCOLM NICHOLSON, a citizen of the Dominion of Canada, residing at the town of Goderich, in the county of Huron and Province of Ontario, Canada, have invented a new and useful Hot-Water Boiler, (for which I have obtained a patent in the Dominion of Canada, No. 32,751, bearing date November 8, A. D. 1889,) of which the following is a specification.

My invention relates to improvements in heating houses and other buildings with hot water, which circulates through pipes passing through the house or other building to be heated, which said pipes are connected with a furnace, in which the water is first heated before passing into the before-mentioned pipes, and which said furnace is so constructed as to have its sides, top, bottom, and ends double, the spaces between being all connected with each other and filled with water, the fire which is placed in the center of the furnace being thus entirely surrounded with water-compartments.

The object of my improvements is to supply the necessary heat from a small amount of fuel in a convenient furnace and one in which any kind of fuel may be used. I attain this object by the mechanism illustrated in the accompanying drawings, in which—

Figure 1 is a vertical transverse section of boiler. Fig. 2 is a longitudinal section of the same, and Fig. 3 is a horizontal section thereof.

Similar letters refer to similar parts throughout the several views.

The outside casing E and the inside casing F form the frame-work of the entire boiler, and they inclose the hot-water compartments G. The whole space between the outside and inside casings of the top, bottom, sides, and ends of the furnace being utilized as hot-water compartments, the stay-bolts H connecting the inside and outside casings.

A designates a feed-duct, which is arranged on the top of the outer shell or casing and has its lower end communicating with the water-compartment. The entire water-compartment can thus be filled by pouring or otherwise passing water through this duct.

The pipes or tubes through which the hot water passes to heat the room or building are connected with the furnace by the ducts B and C.

The furnace-fire is laid through the fuel-door X on the grate O, the smoke escaping through the smoke-escape D, the damper Z controlling the draft. The ashes are removed through the door Y.

K are horizontal transverse tubes connecting with the water-compartments of the sides of the furnace, which assist in heating the water passing through them.

M are longitudinal tubes connecting with the water-compartments at the back of the furnace, which assist in heating the water passing through them. After the water is heated it passes out into the pipes by the duct C, and after passing through the pipes in the building returns into the furnace water-compartments at the duct B.

The furnace may be constructed of either malleable iron or steel.

What I claim by my invention, and desire to secure by Patent, is—

The improved hot-water boiler herein described and shown, consisting of an outer shell, an inner shell arranged concentrically therein and forming a water-chamber therewith, a series of bolts connecting said shells, a grate O in the lower portion of the shells at the front end of the same, a fuel-door in the front ends of the shells, a smoke-outlet in the rear ends thereof, a feed-duct on the top of the outer shell entering the water-compartment, the water-outlet pipe leading from the side of the water-compartment, the return-pipe entering the side of the water-compartment near the bottom of the same, a series of transverse water-tubes connecting the sides of the inner shell and arranged in a plane substantially parallel with the rear end of the furnace, and a series of horizontal V-shaped water-tubes arranged just above the grate and connected with the inner shell at their rear ends, substantially as shown.

MALCOLM NICHOLSON.

Witnesses:
MALCOLM GOODING NICHOLSON,
EDWARD NORMAN LEWIS.